(12) United States Patent
Berends

(10) Patent No.: US 6,589,003 B2
(45) Date of Patent: Jul. 8, 2003

(54) VEHICLE BLOCKING DEVICE

(75) Inventor: Jan Berends, Buitenpost (NL)

(73) Assignee: Stertil B.V. (NL)

( * ) Notice: Subject to any disclaimer, the term of this patent is extended or adjusted under 35 U.S.C. 154(b) by 0 days.

(21) Appl. No.: 09/890,460

(22) PCT Filed: Dec. 4, 2000

(86) PCT No.: PCT/NL00/00893

§ 371 (c)(1),
(2), (4) Date: Aug. 1, 2001

(87) PCT Pub. No.: WO01/43526

PCT Pub. Date: Jun. 21, 2001

(65) Prior Publication Data

US 2002/0136620 A1 Sep. 26, 2002

(30) Foreign Application Priority Data

Dec. 3, 1999 (NL) .............................................. 1013747

(51) Int. Cl.[7] .................................................. B60T 1/14
(52) U.S. Cl. ...................................................... 414/401
(58) Field of Search ................................ 414/401, 402, 414/400; 411/190, 222, 282, 340; 74/527, 424.78; 297/362.14

(56) References Cited

U.S. PATENT DOCUMENTS

| | | | | | |
|---|---|---|---|---|---|
| 3,072,975 A | * | 1/1963 | Burmeister | .................. | 105/155 |
| 5,249,905 A | * | 10/1993 | Warner et al. | ................. | 410/30 |
| 5,375,965 A | * | 12/1994 | Springer et al. | ............... | 410/30 |
| 5,582,498 A | * | 12/1996 | Springer et al. | ............... | 188/32 |
| 5,704,295 A | * | 1/1998 | Lohr | ........................... | 104/243 |
| 5,762,459 A | * | 6/1998 | Springer et al. | ............... | 188/32 |
| 5,847,807 A | * | 12/1998 | Steinmetz | .................... | 351/245 |
| 6,045,188 A | * | 4/2000 | Schooler | ....................... | 188/67 |
| 6,082,952 A | * | 7/2000 | Alexander | .................... | 188/32 |

* cited by examiner

*Primary Examiner*—Eileen D. Lillis
*Assistant Examiner*—Charles A. Fox
(74) *Attorney, Agent, or Firm*—Mark Zovko

(57) ABSTRACT

The invention relates to a device for blocking a vehicle, comprising a guide track which can be disposed along a driveway, a carriage which engages on the guide track and is displaceable therealong in guided manner and which is provided with transversely protruding wheel engaging means and locking means for locking the carriage, wherein the guide track comprises on a front end a part extending upward from close to the driveway and, connecting thereto, a part extending substantially parallel to the driveway, and the carriage engages on the guide track close to a front end and a rear end.

11 Claims, 5 Drawing Sheets

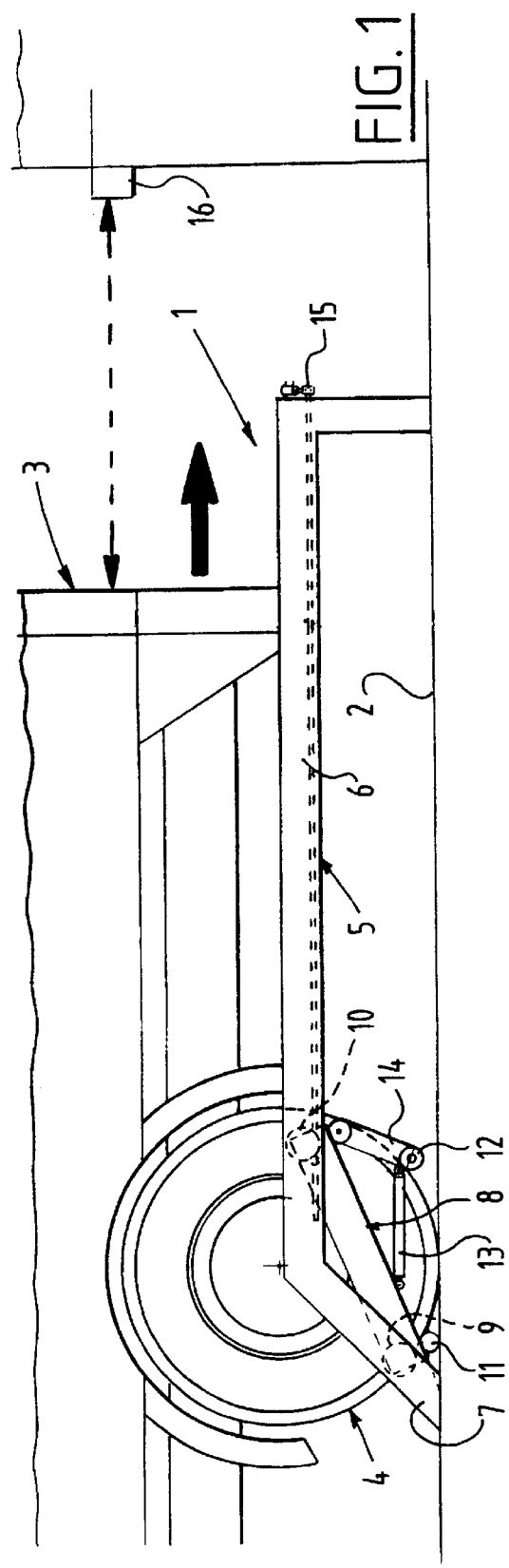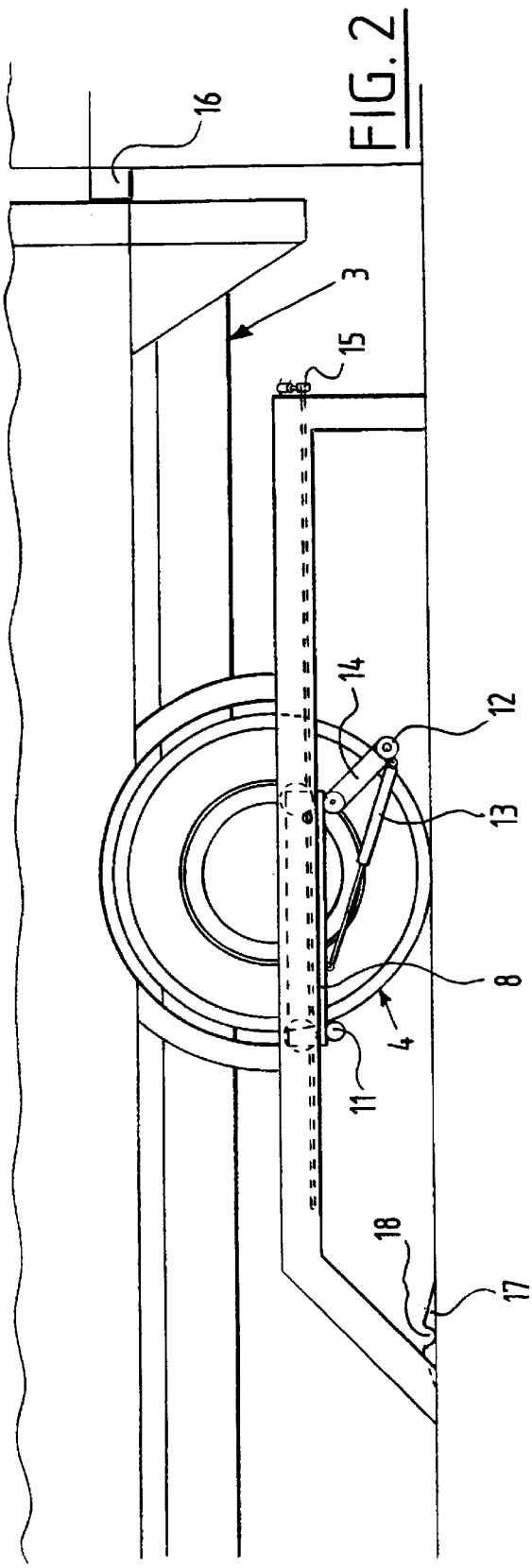

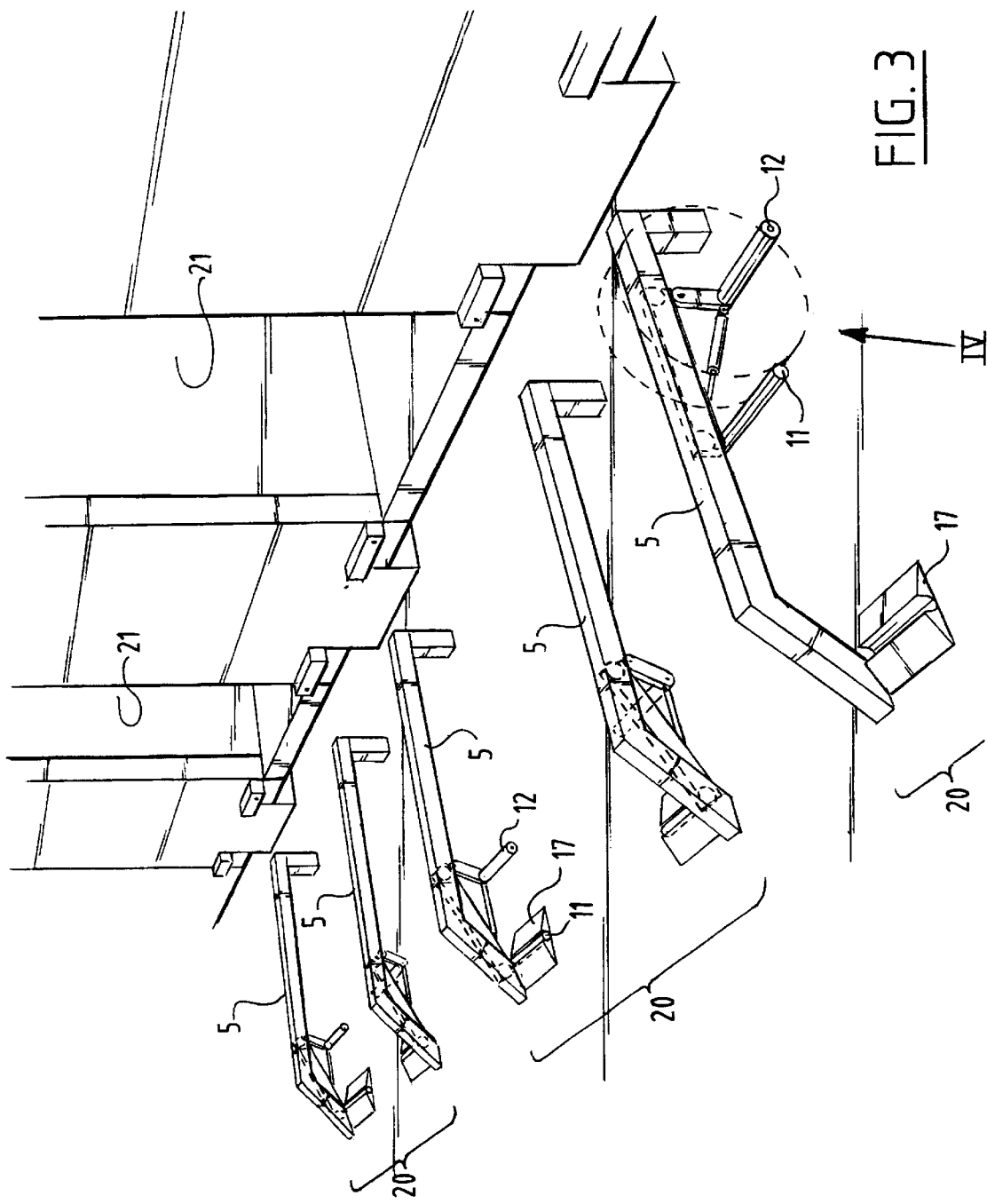

VEHICLE BLOCKING DEVICE

The invention relates to a device for blocking a vehicle, comprising a guide track which can be disposed along a driveway, a carriage which engages on the guide track and is displaceable therealong in guided manner and which is provided with transversely protruding wheel engaging means and locking means for locking the carriage.

Such a device is known from Netherlands patent application 9302280. The wheel engaging means are herein displaceable in transverse direction relative to the carriage.

A device of the present type is used particularly at loading platforms, where a truck with its loading opening at the rear can be manoeuvred against a loading opening or platform of a storage area. The device herein prevents the truck being able to roll away, which is particularly dangerous when for instance cargo is being transported into and/or out of the truck with fork-lift trucks.

The known device is quite complicated. It comprises separate drive means for the carriage and the wheel engaging means.

The invention therefore has for its object to provide a vehicle blocking device of the type stated in the preamble which is of simple construction.

This objective is achieved with the device according to the invention according to the following. During the rearward movement of the carriage along the guide track the front end of the carriage rises upward in the movement along the rising front end of the guide track. One of the elements of the wheel engaging means on the front end of the carriage herein also rises upward and can thus move against the front side of a wheel of the vehicle for blocking in order to block this vehicle at the desired position. The device can take a particularly simple form since no separate drive means are necessary for the carriage and the wheel engaging means. With a suitable embodiment of the wheel engaging means the carriage can be carried along in rearward direction by the wheel of the truck for blocking and, after blocking of the carriage relative to the guide track, the wheel is blocked.

A favorable embodiment is characterized in that the rear end of the carriage hereby engages in the part of the guide track extending substantially parallel to the driveway so that this rear end, in the movement rearward from the front end, can run smoothly.

A very simple and robust construction is hereby possible with the present invention. A particularly suitable C-profile is a profile which is already applied for vehicle lifts. A carriage is here also movable in the profile using wheels which are enclosed in the C-profile.

The carriage can be automatically co-displaced by wheels of different diameter rearward from the position at the front end of the guide track, wherein the front end of the carriage rises upward and the transverse protrusion arranged on the front end of the carriage can fulfil the blocking function of the wheel. In order to obtain a wide adaptability to wheel diameters the embodiment of FIG. 5 is preferably applied.

A noted objective of the present invention is that the spring force advantageously remains practically constant over the long stroke of the second transverse protrusion.

For blocking of the wheel it is necessary that the first transverse protrusion comes to lie on the front side of the wheel. This can be brought about in simple manner according to the present invention. The wheel can readily travel smoothly over the transverse protrusion.

A suitable embodiment of locking means of the device according to the invention provides that carriage can be locked herewith in any random position relative to the guide track.

A good guiding of the rod relative to the holder is achieved by applying the measure wherein the rod has a circular periphery and is provided with at least one longitudinal groove, the holder has a corresponding circular opening with at least one inward protruding ridge which falls into the corresponding longitudinal groove in an unlocked position and in which the complementary grooves are arranged, and wherein the blocking means can rotate the rod on its longitudinal axis from the unlocked position into a locked position.

The rod can be manufactured simply from a commercially available threaded rod. Only the longitudinal groove or grooves have to be arranged in the rod.

The invention will be further elucidated in the following description and with reference to the annexed figures.

FIG. 1 shows a side view of an embodiment of the vehicle blocking device according to the invention in a first operating position.

FIG. 2 shows the device of FIG. 1 in a second operating position.

FIG. 3 shows a perspective view of a loading station in which a number of devices according to the invention are arranged.

Figure 4:
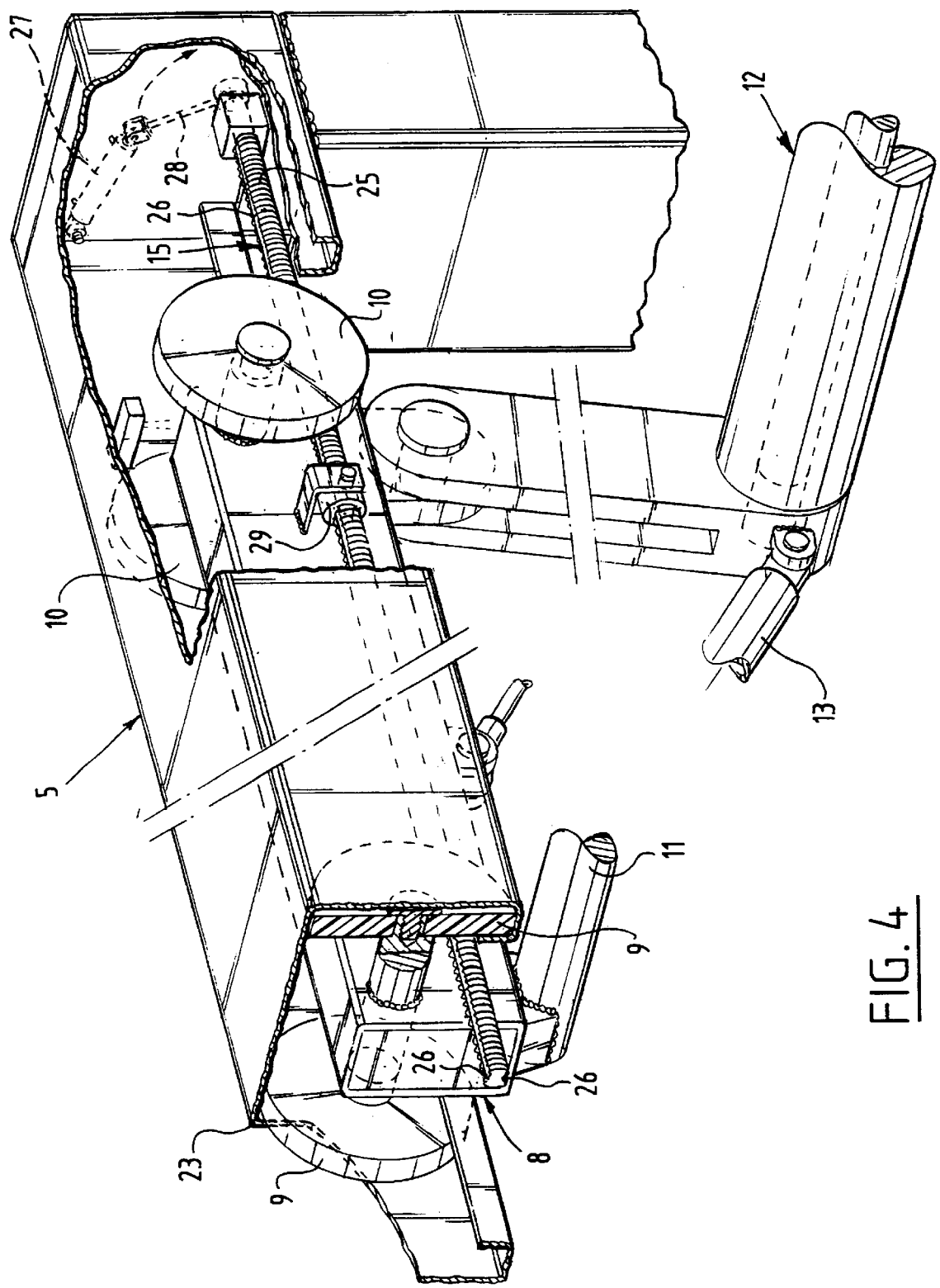
FIG. 4 shows a partly broken-away perspective view along arrow IV in FIG. 3.

The device 1 according to the invention shown in side view in FIG. 1 is intended for the blocking of a vehicle 3, particularly by locking a wheel thereof against displacement.

Device 1 comprises a guide track 5 disposed along a driveway 2, along which track a carriage 8 is displaceable from the foremost position shown in FIG. 1 to a position located further to the rear as shown in FIG. 2.

At the front end shown on the left in the figures the guide track 5 comprises a part 7 extending obliquely upward from driveway 2 and, connecting thereto, a part 6 which extends parallel to driveway 2.

Carriage 8 is provided with wheels which engage in guide track 5 in a manner to be described further. Wheels 9, 10 are arranged at the front end respectively rear end of carriage 8. In the situation of FIG. 1 the front wheel 9 is moved downward along the obliquely rising part 7 of guide track 5, so that the front end of carriage 8 is situated at a low level. The rear end of carriage 8, on which wheel 10 is arranged, is still situated in the horizontal part 6 of guide track 5, and therefore at a higher level.

From consideration of FIGS. 1 and 2 it will be apparent that when the carriage moves from the situation of FIG. 1 to that of FIG. 2, the front end of carriage 8 initially moves obliquely upward until it arrives at the level of the horizontal part 6 of guide track 5 and then moves rearward in the same position along this horizontal part 6.

Two transverse protrusions 11 respectively 12 are arranged on carriage 8. These protrusions 11, 12 protrude laterally outside guide track 5, as shown clearly in FIG. 3. Protrusion 12 is herein arranged on a pivot arm 14. Between the end of pivot arm 14 and carriage 8 is arranged a spring 13 which in this embodiment is advantageously a gas spring and with which the arm 14 is urged into the moved forward position as shown in FIG. 1. The arm, and therewith the protrusion 12, can be moved rearward counter to the action of spring 13 into the relative position of FIG. 2.

In the moved forward position of carriage 8, wherein the front end is moved downward in the oblique part 7 of guide track 5, the protrusion 11 lies on driveway 2. At the position where this protrusion 11 lies on driveway 2 is placed a ramp 17, in a recess 18 of which the transverse protrusion 11 is received in this situation. Via this ramp 17 a wheel 4 of truck 3 can thus drive simply over the transverse protrusion 11 into the position of FIG. 1.

The transverse protrusion 12 on arm 14 herein comes to lie against the rear side of wheel 4. Depending on the diameter of wheel 4, the transverse protrusion 12 on arm 14 will be displaced a shorter or longer distance relative to carriage 8, such that both protrusion 11 and protrusion 12 come to lie against the wheel. When truck 3 now moves further to the rear, wheel 4 will carry along the carriage 8 by means of the force exerted against the transverse protrusion 12, wherein this carriage with its wheels 9, 10 moves rearward in guide track 5.

As wheel 4 moves rearward, carriage 8 will thus initially move obliquely upward with its front end, wherein the transverse protrusion 11 thus comes to lie at a higher position against tyre 4.

When truck 3 is now driven into the position in which it must be blocked, in particular the position as shown in FIG. 2, carriage 8 is locked relative to the guide track using a locking means 15 to be described in more detail, so that truck 3 can no longer move back in forward direction because the transverse protrusion 11 prevents this.

The desired position in which the locking comes into operation can for instance be determined using a distance sensor 16 which is arranged on a tyre against which the truck must be parked. This sensor can measure the distance to truck 3 or be a contact sensor which comes into operation as soon as truck 3 drives against it. Depending on the operation and the adjustment of sensor 16, the locking 15 can be activated at the desired correct moment using an associated control device.

As shown in FIG. 3 in a suitable application of the device according to the invention, a pair 20 of devices as shown in FIGS. 1 and 2 is arranged in each case in front of an opening 21 against which the truck must be parked in reverse. These openings 21 can for instance be loading and unloading openings in a warehouse, wherein cargo can be transported from truck 3 into the warehouse or from the warehouse into the truck. Using blocking devices 1 according to the invention the truck 3 is secured in reliable manner during the loading and unloading, so that the truck cannot move away from opening 21 unintentionally during loading and unloading. This could result in great danger for the staff carrying out the loading and unloading, particularly when use is made therein of a fork-lift truck which drives from the storage area into truck 3 and back again.

The embodiment with a device according to the invention per opening 21 will normally be the standard embodiment. The dual arrangement as shown in the figures is desirable when vehicles with steerable rear axle must be reversed between the devices and the tractive unit is not in front of the vehicle. Since the device according to the invention also functions as wheel constrainer, the steerable rear axle, which tends to drift outward, will herein be enclosed between the two devices.

FIG. 4 shows in more detail the construction of the preferred embodiment of the device as shown in the foregoing figures.

Guide track 5 is herein manufactured from a generally C-shaped profile 23 which is also used in particular for lifting columns of vehicle lifts. Carriage 8 is provided at the front and rear end with pairs of wheels 9, 10 which are arranged fitting in the height of the C-profile. It will be apparent that due to the wheels 9, 10 being enclosed in C-profile 23 the carriage is locked against both a transverse and a vertical displacement.

The embodiment of locking device 15 applied in the shown device comprises a rod 25 which extends along the horizontal part 6 of the guide track and which can for instance be a threaded rod. Grooves 26 are arranged at mutually opposite positions in this rod such that, as seen over the periphery of rod 25, a quarter of the periphery does have grooves and a quarter of the periphery does not, this in alternating manner.

Mounted on carriage 8 is a holder 29 which has a continuous opening which is complementary to the section of the rod 25 provided with grooves. The opening is herein such that the holder is freely slidable over the length of rod 25.

The catching parts of the opening in holder 29 which protrude into grooves 26 take the form of ribs which correspond with the grooves in rod 25. At a rotation of the rod 25 through 90° relative to holder 29, the ribs of holder 29 will thus come into engagement with the grooves of rod 25, whereby a relative longitudinal displacement is prevented. The locking is therefore based on this action. In the position of rod 25 shown in FIG. 4 the holder 29, as noted, can move freely over bar 25 and carriage 8 can thus displace freely along guide track 5. When carriage 8 has arrived at the desired blocking position, a pneumatic cylinder 27 is activated which rotates rod 25 through 90° via an arm 28. The grooves and the ribs thereby come into mutual engagement and carriage 8 is locked in its position. In another embodiment the pneumatic cylinder can also comprise another adjusting mechanism, such as an electric setting motor or the like.

Figures 5, 6:
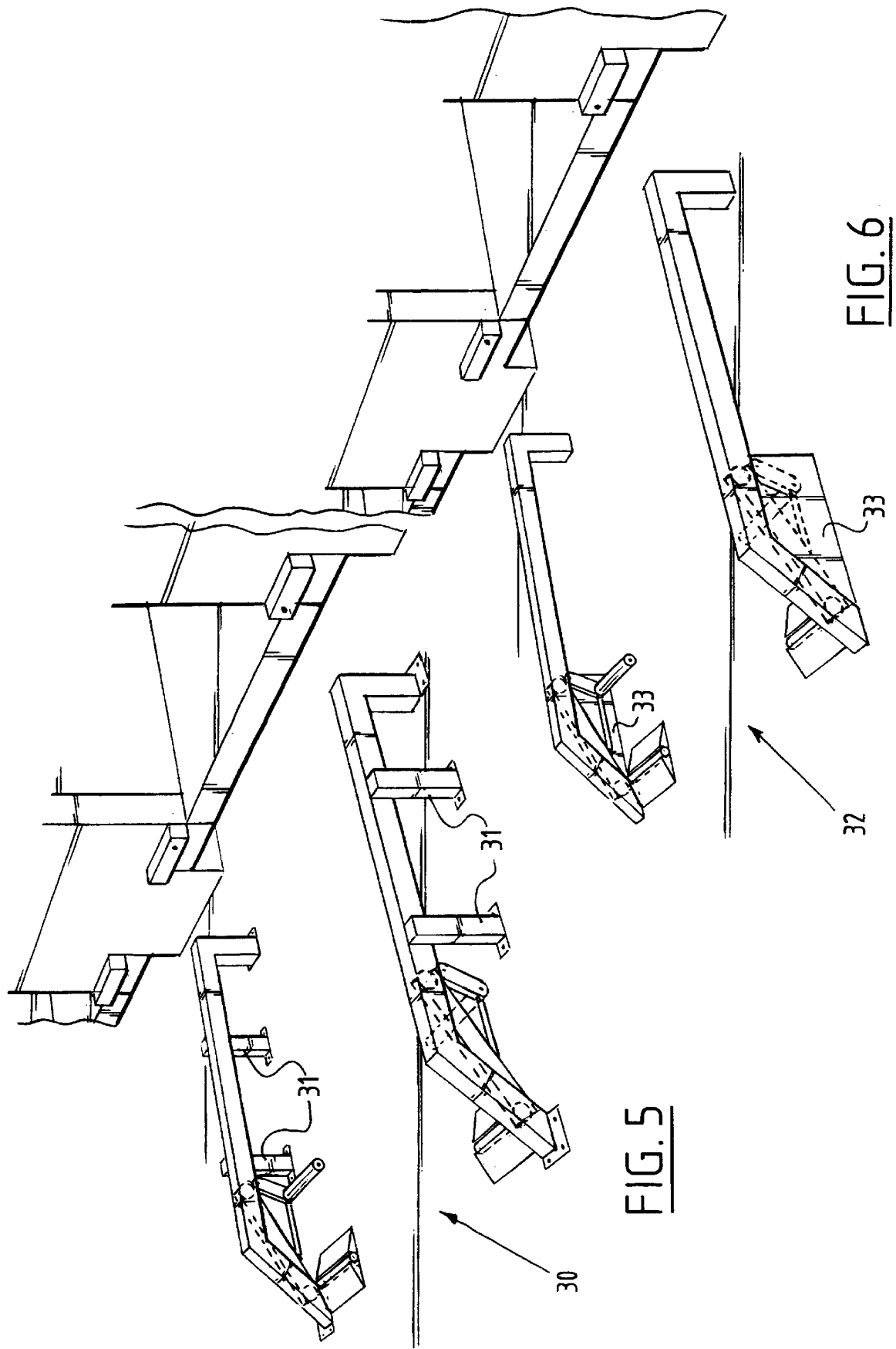
FIGS. 5, 6 and 7 show perspective views of three embodiment variants.
Figure 7:
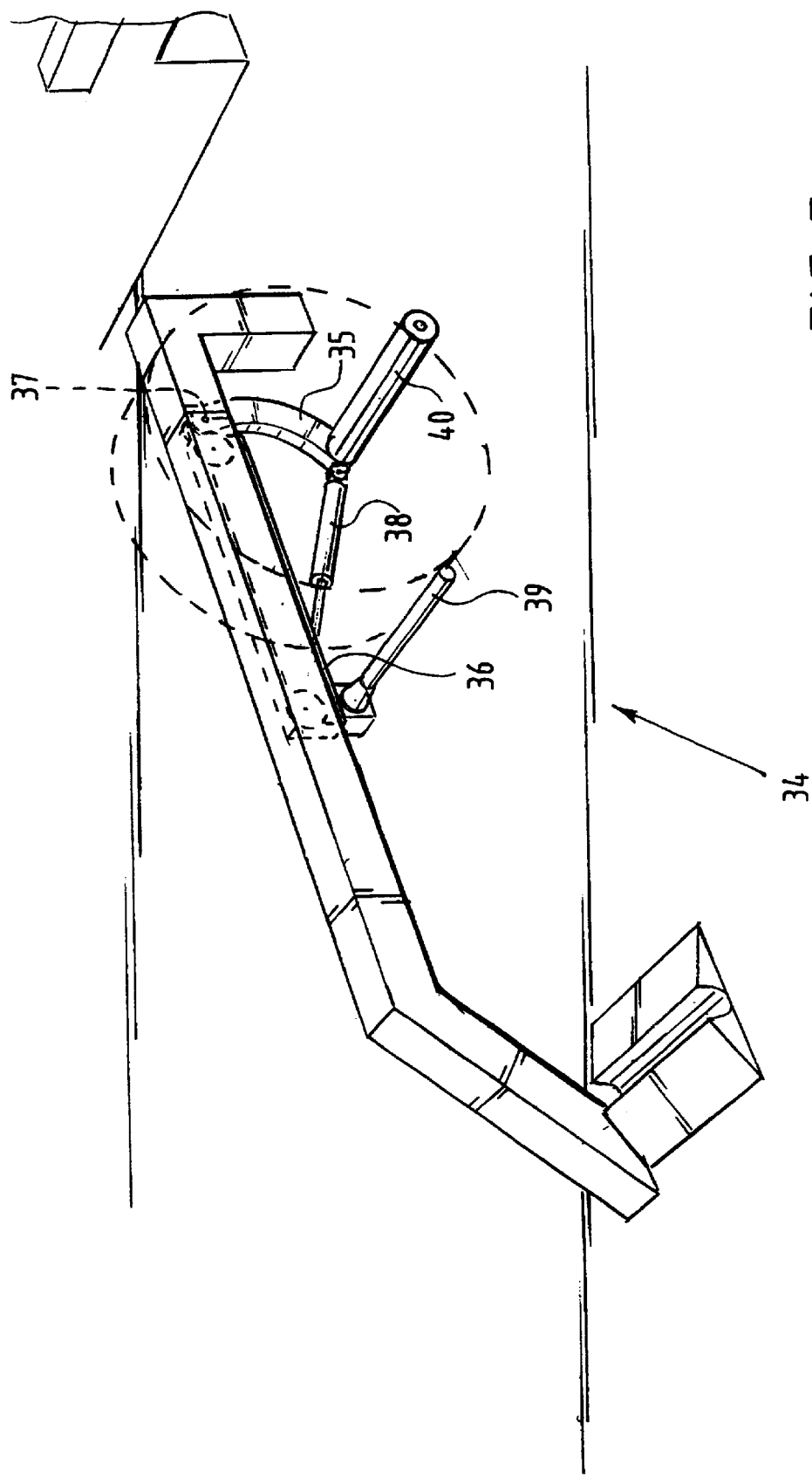

FIGS. 5, 6 and 7 show some further variants. In device 30 of FIG. 5 additional uprights 31 are used which give extra support to the guide track, in order to prevent deformation in the case of an unintentionally hard contact with for instance a truck.

In device 32 of FIG. 6 protective plates 33 are arranged which prevent the feet of bystanders being trapped. Supports 31 and protective plates 33 can of course also be employed together.

In device 34 of FIG. 7 the rearmost transverse protrusion 40 is arranged on a curved arm 35 which is mounted as high as possible on the rear end of carriage 36.

The arm 37 is once again further connected resiliently to carriage 36 with a gas spring 38.

Owing to the far to the rear and high position of the bearing 37 of arm 35 a maximum relative displacement of the rearmost transverse protrusion 40 relative to carriage 36 is obtained, so that a maximum adaptability to different wheel diameters is obtained.

The transverse protrusions 39, 40 are preferably mounted rotatably on respectively carriage 36 and arm 35. Vertical forces are hereby minimized, whereby the longitudinal movement of the carriage is hampered as little as possible and the risk of the wheel driving over a protrusion 39 or 40 is also minimized.

The invention is not limited to the embodiment shown here. Another embodiment of particularly the guide track, the carriage and the locking can thus be chosen. A very simple construction with few moving parts is however obtained which is advantageous for operational reliability and manufacturing costs.

What is claimed is:

1. Device for blocking a vehicle, comprising:
    a singular guide track which is disposable alongside a driveway and comprises on a front end a part extending upward from close to the driveway and, connecting thereto, a part extending substantially parallel to the driveway;

an elongate carriage having a front end and a rear end, said elongate carriage also having transversely protruding wheel engaging means fixed to said carriage, said carriage engages on the guide track and is displaceable therealong in guided manner, and said transversely protruding wheel engaging means are fixed to a front end of the carriage corresponding with the front end of the guide rail, wherein said rear end of said elongate carriage engages on said part of the guide track substantially parallel to the driveway; and locking means for locking said carriage in said guide track.

2. Device as claimed in claim 1, wherein the distance between parts of the carriage engaging the guide track is greater than the length of the upward extending part of the guide track.

3. Device as claimed in claim 1, wherein the guide track is a C-profile with the opening directed downward and parts of the carriage engaging the guide track are wheels enclosed in the C-profile.

4. Device as claimed in claim 1, wherein the wheel engaging means comprise a first transverse protrusion connected fixedly to the carriage close to a front end and a second transverse protrusion displaceable away from the first transverse protrusion by spring force.

5. Device as claimed in claim 4, wherein the second transverse protrusion is arranged on an arm connected pivotally to the carriage.

6. Device as claimed in claim 4, wherein a gas spring is arranged between the second transverse protrusion and the carriage.

7. Device as claimed in claim 4, wherein the first transverse protrusion is arranged on the carriage such that it lies at least practically on the driveway in the position of the carriage moved to the front end of the guide track.

8. Device as claimed in claim 7, wherein a ramp is arranged on the driveway on either side of the position where the first transverse protrusion is situated in the position of the carriage moved to the front end of the guide track.

9. Device as claimed in claim 1, wherein the locking means comprise a rod which extends along the parallel part and which is provided with regularly distributed grooves, a holder arranged on the carriage and provided with complementary grooves and blocking means for bringing the grooves of the holder and the rod into mutual engagement.

10. Device as claimed in claim 9, wherein the rod has a circular periphery and is provided with at least one longitudinal groove, the holder has a corresponding circular opening with at least one inward protruding ridge which falls into the corresponding longitudinal groove in an unlocked position and in which the complementary grooves are arranged, and wherein the blocking means can rotate the rod on its longitudinal axis from the unlocked position into a locked position.

11. Device as claimed in claim 9, wherein the regularly distributed grooves are the threads of a screw thread.

* * * * *